United States Patent [19]

Satoh et al.

[11] 4,076,922

[45] Feb. 28, 1978

[54] METHOD FOR PRODUCING ETHYLENE POLYMERS

[75] Inventors: Akihiro Satoh, Kimitsugun; Akio Takahashi; Jun Masuda, both of Ichiharashi; Masato Harada, Chibashi; Sadahiko Yamada, Ichiharashi, all of Japan

[73] Assignee: Chisso Corporation, Osaka, Japan

[21] Appl. No.: 711,022

[22] Filed: Aug. 2, 1976

[30] Foreign Application Priority Data

Aug. 8, 1975   Japan .................................. 50-96427

[51] Int. Cl.$^2$ .......................... C08F 4/02; C08F 10/02
[52] U.S. Cl. .................................. 526/97; 252/429 C; 526/114; 526/115; 526/116; 526/119; 526/124; 526/125; 526/352
[58] Field of Search ................. 526/97, 114, 115, 116, 526/119, 121, 122, 124, 125

[56] References Cited

U.S. PATENT DOCUMENTS 3,491,073   1/1970   Marinak ............................... 526/116
3,678,025   7/1972   Birell .................................... 526/116
3,900,454   8/1975   Sato et al. ............................ 526/115

FOREIGN PATENT DOCUMENTS 1,314,198   4/1973   United Kingdom.

Primary Examiner—Edward J. Smith
Attorney, Agent, or Firm—Fred Philpitt

[57] ABSTRACT

An improvement in the method for producing ethylene polymers by using a catalyst consisting of a combination of a following solid product with an organoaluminum compound is provided.

Said solid product (III) is prepared by reacting a trivalent metal halide with a divalent metal compound; reacting the resulting reaction product with a transition metal compound in the form of liquid; reacting the resulting solid product (I) with an aluminum or boron alcoholate; and reacting the resulting solid product (II) again with a transition metal compound in the form of liquid to obtain said solid product (III).

Ethylene polymers obtained according to this method have broader molecular weight distributions.

18 Claims, No Drawings

METHOD FOR PRODUCING ETHYLENE POLYMERS

DESCRIPTION OF THE INVENTION

This invention relates to a method for producing ethylene polymers. More particularly it relates to a novel method for producing ethylene polymers having a broad molecular weight distribution.

The ethylene polymerization and ethylene polymers referred to herein include not only homo-polymerization and homopolymer of ethylene, but also copolymerization and copolymers of ethylene with a small amount of other olefins copolymerizable therewith (including diolefins).

The present inventors previously proposed a polymerization method of α-olefins in the presence of a catalyst obtained by reacting (a) a trivalent metal halide with (b-1) a halide hydrate, a hydroxide or the like of metals belonging to Groups I–VIII of the Periodic Table; reacting the resulting solid reaction product with (c) a transition metal compound; and combining the resulting solid reaction product with (d) an organoaluminum compound (Japanese Patent Publications Nos. 13609/1972 and 13772/1972). Further the present inventors proposed a polymerization method of α-olefins wherein a solid reaction product obtained by replacing said (b-1) by (b-2) an oxide or carbonate of metals belonging to Groups I–VIII of the Periodic Table is employed, the preparation of which solid reaction product is easy in operation and not accompanied with disadvantages such as dehydrochlorination (Japanese Patent Publications Nos. 11806/1972 and 16782/1974). (These inventions mentioned above will be hereinafter referred to as prior inventions.)

According to the methods of these prior inventions, superior effectivenesses such as a high efficiency of availability of transition metal compound, a notable reduction in the molecular weight of polymer by means of hydrogen used at the time of polymerization, no formation of polymer film on the wall of polymerization vessel, etc., but the molecular weight distribution of ethylene polymer is narrow.

As for α-olefin polymers, particularly ethylene polymers, resins having a narrow molecular weight distribution are more suitable for injection molding, but, on the other hand, resins having a broad molecular weight distribution are preferable for extrusion molding of pipes of exterior coatings, blow molding of hollow products, or spinning of filaments. If ethylene polymers having a narrow molecular weight distribution are employed for blow molding of hollow products, there are such disadvantages that the pressure of resin at the time of the molding increases too much; a melt-fracture occurs at the time of the molding which makes the molding infeasible; even if the molding is feasible, the surface condition of the resulting molded product becomes worse; etc. According to the methods of the prior inventions of the present inventors, since the resulting ethylene polymers have a narrow molecular weight distribution, they are preferable for injection molding, but not always preferable for blow molding of hollow products.

There have been known various methods for controlling molecular weight distribution in polymerization. In general, if it is attempted to broaden the molecular weight distribution, the polymerization activity is often reduced. Among various methods mentioned above, a method using a metal alcoholate as a catalyst component is disclosed in Japanese Patent Publication No. 34098/1971. According to this method wherein a magnesium alcoholate is mixed with a magnesium compound containing a hydroxyl radical and the resulting mixture is reacted with a titanium compound, the $\overline{M}w/\overline{M}n$ ($\overline{M}w$, weight average molecular weight; $\overline{M}n$, number average molecular weight; the ratio is employed for expressing the molecular weight distribution) can be controlled in the range of 4 to 8, depending upon the content of the hydroxyl radical. Further Japanese Patent application laid-open No. 102680/1975 disclosed that according to a method wherein a titanium or/and vanadium compound is supported on a carrier consisting of magnesium oxide and an aluminum alkoxide, a polymer having a broad molecular weight distribution is obtained.

On the other hand, besides the above-mentioned methods, those using a metal alcoholate as a catalyst component are also disclosed (Japanese Patent Publications Nos. 1768/1972, 21573/1972 and 42137/1972 and Japanese Patent application laid-open No. 6111/1971). Polymers obtained according to these methods are suitable for injection molding, and molded products having a small shrinkage ratio and also little deformation are obtained. According to the method of the above-mentioned Japanese Patent Publication No. 1768/1972, a tetravalent titanium compound containing halogen is reacted with a metal alcoholate complex or a mixture of a metal alcoholate complex with a metal alcoholate. According to the method of the above Japanese Patent Publication No. 21573/1972, a magnesium compound containing a hydroxyl radical is reacted with a reaction product of a tetravalent titanium compound containing halogen with an aluminum alcoholate or/and a silicic acid alkyl ester. According to the method of the above-mentioned Japanese Patent Publication No. 42137/1972, a halogen derivative of titanium or/and vanadium is reacted with a metal alcoholate. Further according to the method of the above Japanese Patent application laid-open No. 6111/1971, magnesium ethylate is reacted with a titanium compound containing chlorine.

According to these methods, a metal alcoholate is reacted, as it is, with a transition metal compound; or a metal alcoholate is reacted with a magnesium compound containing hydroxyl radical or it is converted into a metal alcoholate complex salt, and the resulting material is reacted with a transition metal compound.

The present inventors have made strenuous studies for improving the catalysts of the prior inventions made by the present inventors themselves, and found a catalyst entirely different from those of the above-mentioned various inventions, although an alcoholate is employed as a catalyst component as well, and as a result, completed a method for producing ethylene polymers according to which superior effectivenesses such as a broad molecular weight distribution, a large amount of polymer formed per hour, etc. are obtained.

A first object of the present invention is to provide a method for producing ethylene polymers having a much broader molecular weight distribution than those of the above-mentioned prior inventions, superior in processability and suitable for extrusion molding products wherein a beautiful appearance is required.

A second object of the present invention is to provide a method for producing ethylene polymers having a broad molecular weight distribution while holding such superior effectivenesses as a very high efficiency of transition metal, a sufficiently high yield of ethylene polymers based on solid product to be combined with an organoaluminum compound, no formation of polymer film on the wall of polymerization vessel at the time of polymerization, etc.

Other objects of the present invention will become apparent from the description mentioned below.

The present invention is directed to an improvement in the method for producing ethylene polymers by homo-polymerization of ethylene or copolymerization of ethylene with a small amount of another α-olefin or a diolefin in the presence of a catalyst obtained by combining a solid product having on its surface, atoms of a transition metal of Group IVA or VA of the Periodic Table, with an organoaluminum compound.

Said improvement comprises using as said solid product, (III) a solid product obtained by reacting (A) a trivalent metal halide with (B) a divalent metal hydroxide, oxide or carbonate or a double salt containing these compounds or a hydrate of divalent metal compound; reacting the resulting reaction product with (D) a compound of a transition metal of Group IVA or VA of the Periodic Table in the form of liquid; reacting (I) the resulting solid product with an alcoholate of aluminum or boron; and reacting (II) the resulting solid product again with (D') a compound of a transition metal of Group IVA or VA of the Periodic Table, same as or different from said (D), in the form of liquid.

In the preparation of the catalyst employed in the method of the present invention, the order of addition of the alcoholate of aluminum or boron and the transition metal compounds (twice) must be as follows:

The alcoholate of aluminum or boron is at first reacted with (I) a solid reaction product on which surface atoms of a transition metal are combined and thereafter the resulting reaction product is separately reacted with a transition metal compound. If the alcoholate of aluminum or boron is coexistent with a transition metal compound from the beginning, the alcoholate reacts with the transition metal compound in advance of the reaction of the alcoholate with the solid reaction product. Thus the effectiveness of the present invention cannot be obtained.

The present invention is different in this feature from the above Japanese Patent Publications No. 34098/1971, 1768/1972 and 21573/1972 and Japanese Patent Application laid-open No. 6111/1971.

Further, in the reaction of said solid reaction product (I) with said alcoholate, if said transition metal compound in the form of liquid is coexistent with them, said alcoholate reacts with said transition metal compound in the form of liquid, in advance of the above-mentioned reaction. Thus the effectivenesses of the present invention cannot be obtained. Whereas, according to the above-mentioned various inventions, their effectivenesses can be obtained by the above-mentioned coexistence. Accordingly the present invention is also different in this feature from the above-mentioned inventions.

Furthermore, said solid product (I) to be reacted with an alcoholate of aluminum or boron has atoms of transition metal on its surface, and it is necessary to combine said solid product with an organoaluminum compound, for providing it capability of polymerizing α-olefins. In this respect, too, the present invention is greatly different from the above-mentioned various inventions and Japanese Patent Application laid-open No. 102680/1975.

Next the method of the present invention will be mentioned below in detail.

The materials used in the preparation of the catalyst employed in the method of the present invention are as follows:

A. ... trivalent metal halide
B. ... divalent metal hydroxide, oxide or carbonate or double salt containing these or hydrate of divalent metal compound
C. ... organic solvent
D., D'. ... transition metal compound of Group IVA or VA of the Periodic Table in the form of liquid
E. ... alcoholate of aluminum or boron
F. ... organoaluminum compound The above-mentioned materials will be often abbreviated as (A), (B), etc. in the following description.

First, the method for preparing the catalyst employed in the method of the present invention will be explained below.

The method for preparing the solid product (I) containing atoms of transition metal on its surface is as follows:

At first, (A) a trivalent metal halide is reacted with (B) a divalent metal hydroxide, oxide or carbonate, or a double salt containing these compounds or a hydrate of a divalent metal compound, and thereafter the resulting product is reacted with (D) a transition metal compound of Group IVA or VA of the Periodic Table in the form of liquid, in the presence of (C) an organic solvent, followed by filtration, repeated washings with a solvent such as normal hexane until no free transition metal compound is detected, and drying.

As for (A) a trivalent metal halide, aluminum trichloride (anhydrous) and ferrous trichloride (anhydrous) are mentioned.

As for (B) a divalent metal compound, the following examples are mentioned:
hydroxides such as $Mg(OH)_2$, $Ca(OH)_2$, $Ba(OH)_2$, $Zn(OH)_2$, $Mn(OH)_2$, $Fe(OH)_2$, $Co(OH)_2$, $Ni(OH)_2$; oxides such as MgO, CaO, BaO, ZnO, MnO, FeO, CoO, NiO; double oxides containing divalent metals such as $MgAl_2O_4$, $Mg_2SiO_4$, $Mg_6MnO_8$; carbonates such as $MgCO_3$, $MnCO_3$, $CaCO_3$, $BaCO_3$, $MgCO_3.CaCO_3$; halide hydrates such as $SnCl_2.2H_2O$, $MgCl_2.6H_2O$, $NiCl_2.6H_2O$, $MnCl_2.4H_2O$, $KMgCl_3.6H_2O$, $BaCl_2.2H_2O$; hydrates of double salts containing an oxide and a halide such as $8 MgO.MgCl_2.15H_2O$; hydrates of double salts containing a divalent metal oxide such as $3MgO.2SiO_2.2H_2O$; hydrates of double salts containing a carbonate and hydroxide such as $3MgCo_3.Mg(OH)_2.3H_2O$; and hydrates of hydroxide-carbonate containing a divalent metal such as $Mg_6Al_2(OH)_{16}CO_3.4H_2O$.

The reaction of (A) a trivalent metal halide with (B) a divalent metal compound is carried out as follows:

(A) and (B) are, in advance, fully mixed together by pulverization by means of a vibration mill for 5 minutes – 10 hours or by means of a ball mill for 5–50 hours. The resulting blend is reacted on heating.

As for the proportion of (A) to (B), the number of atoms of a divalent metal per one atom of (A) a trivalent metal is in the range of 0.1-20, preferably in the range of 1-10. The reaction temperature of (A) with (B) is usually in the range of 20° C–500° C, preferably 80° C–300° C, and the reaction time is suitably in the range of 30 minutes–50 hours.

The reaction product of (A) with (B) is reacted with (D) a transition metal compound in the form of liquid, in the presence of (C) a solvent.

As for (C) a solvent employed, aromatic hydrocarbons are suitable, and the followings can be mentioned:

benzene; alkyl-substituted aromatic hydrocarbons such as toluene, xylene, 1,3,5-trimethylbenzene, 1,2,4,5-tetramethylbenzene, ethylbenzene, diethylbenzene, isopropylbenzene or the like; polynuclear aromatic cyclic compounds or their derivatives such as naphthalene, anthrathene, 2-ethylnaphthalene, 1-phenylnaphthalene or the like; halogenated aromatic hydrocarbons such as chlorobenzene, dichlorobenzenes, 1,3,5-trichlorobenzene, parachlorotoluene or the like; aromatic alkoxide derivatives such as anisole; aromatic ether derivatives such as diphenylether; etc. These aromatic compounds may be employed alone, or in admixture with a saturated aliphatic hydrocarbon such as normal heptane, octane, nonane, decane or the like.

As for (D) a transition metal compound, those are used which are liquid at room temperature (20° C) or which are soluble in (C) a solvent and in the form of solution under the conditions of their use, though it does not matter even when they are solid at room temperature, and the following examples may be mentioned.

titanium or vanadium halides, oxyhalides, alkoxides, alkoxyhalides, acetoxyhalides, etc. such as titanium tetrachloride, titanium tetrabromide, tetraethoxytitanium, tetrabutoxytitanium, monochlorotributoxytitanium, dichlorodibutoxytitanium, trichloromonobutoxytitanium, vanadium tetrachloride, vanadium oxytrichloride, etc.

As for such transition metal compounds, it is preferable to use them in the form of solution having them dissolved in a solvent.

The reaction of the reaction product of (A) with (B), with (D) a transition metal compound in the presence of (C) a solvent is carried out as follows:

Based upon one gram of the reaction product of (A) with (B), the amount of (C) a solvent employed is in the range of 0.05-100 ml, and the amount of (D) a transition metal compound employed is in the range of 0.01-100 g. The order of addition of the reaction product of (A) with (B), (C) a solvent and (D) a transition metal compound has no particular limitation. For example, (C) is mixed with (D) and thereafter the reaction product of (A) with (B) is added to the resulting mixture. Alternatively the reaction product of (A) with (B) is mixed with (C), and thereafter (D) is added to the resulting mixture. The mixture of the reaction product of (A) with (B), with (C) and (D) is subjected to reaction by heating at room temperature (20° C)-500° C, preferably 50° C-300° C. The reaction time is in the range of 10 minutes-50 hours, preferably 30 minutes-10 hours. By this reaction, (D) a transition metal compound is combined with the solid surface of the reaction product of (A) with (B).

After completion of the above-mentioned reaction, unreacted transition metal compound and the solvent are separated by filtration, followed by repeated washings with a solvent such as normal hexane or the like to remove a trace of free transition metal compound. Thus a solid product (I) is obtained.

This solid product (I) has atoms of transition metal bonded onto the surface thereof. This bond is not a mere adhesion nor adsorption, but the atoms of transition metal bonded onto the surface cannot be removed even when the solid product is washed with a solvent such as aliphatic hydrocarbons, etc. Further, when the solid product (I) is combined with an organoaluminum compound to polymerize α-olefins, the resulting catalyst has a very high polymerization activity (see Japanese Patent Publications Nos. 13609/1972, 13772/1972 and 11806/1972 and 16782/1974).

Next, the solid product (I) is reacted with (E) an alcoholate of aluminum or boron. This reaction is carried out in the absence of (D) a transition metal compound.

As for (E) an alcoholate of aluminum or boron, the following examples may be mentioned:

aluminum alcoholates such as aluminum triethoxide $(Al(OEt)_3)$, aluminum triisopropoxide $(Al(O\ i\text{-}C_3H_7)_3)$, aluminum tri-sec-butoxide $(Al(O\text{-sec-}C_4H_9)_3)$, mono-sec-butoxyaluminum diisopropoxide $(i\text{-}C_3H_7O)_2\ Al(\text{sec-}C_4H_9O)$, etc., and boron alcoholates such as boron triisopropoxide $(B(O\text{-}i\text{-}C_3H_7)_3)$, etc.

The reaction of the solid product (I) with (E) an alcoholate of aluminum or boron is carried out by mixing the two components together under pulverization by means of a pulverizing mixer such as a ball mill, a vibration mill or the like, on heating, or by mixing under pulverization and thereafter heating the resulting mixture as it is or in a solvent. As for the mixing proportion of the two components, the amount of the alcoholate of aluminum or boron is in the range of 0.1-1,000 g, preferably 1-200 g per 100 g of the solid product (I). The mixing is carried out in a ball mill for 5-50 hours or in a vibration mill for 5 minutes-10 hours. The reaction of the two components advances even during the time of mixing under pulverization. By carrying out mixing under pulverization while heating the pulverization mixer at room temperature (about 20° C)-500° C, preferably 40°-200° C, the reaction can be completed at the same time. Of course, it is also possible to carry out the reaction by mixing them under pulverization without any particular heating and thereafter heating the resulting mixture at a temperature in the above-mentioned range for 10 minutes – 50 hours. Further it is also possible to carry out the reaction in a solvent. In this case, the two components may be separately introduced into a solvent or may be mixed together in advance and thereafter introduced thereto. The examples of the solvent employed are aliphatic hydrocarbons such as normal hexane, normal butane, normal nonane, normal decane, etc; aromatic hydrocarbons such as benzene, toluene, xylene, ethylbenzene, cumene, etc.; halogenated hydrocarbons such as chlorobenzene, orthodichlorobenzene, chloroform, carbon tetrachloride, dichloroethane, trichloroethylene, tetrachloroethylene, etc.; etc. The amount of the solvent added may be in the range of 1-1,000 ml per 100 g of the total sum of the amounts of the solid product (I) and the alcoholate of aluminum or boron. The temperature of the reaction carried out in a solvent, may be in the range of room temperature (20° C)-500° C, preferably 60° C-300° C, and it is desirable to carry out the reaction for 10 minutes-50 hours. For sufficient reaction, the reaction pressure in the range of 1-50 atm. (absolute) is used.

After completion of the reaction of the solid product (I) with (E) an alcoholate of aluminum, unreacted alcoholate is removed by washing it with a solvent capable of dissolving it therein. As for solvents useful for washing, for example, normal hexane, normal heptane, normal octane, normal nonane, normal decane, benzene, toluene, xylene, ethylbenzene, etc. can be mentioned. It does not matter practically even when a slight amount of free alcoholate is remaining. The reaction product thus obtained is referred to hereinafter as a solid product (II).

This solid product (II) is then reacted with (D) a transition metal compound. This transition metal compound employed in this case may be the same as or different from that employed for the preparation of the above-mentioned solid product (I). The amount thereof used is 1 – 500 g per 100 g of solid product (II). The reaction may be carried out with or without a solvent. In the former case, the kind and amount of solvent employed are similar to those employed in the reaction of the above-mentioned solid product (I) with (E) an alcoholate of aluminum or boron. The reaction temperature and time may be in the ranges of 30°–200° C and 10 minutes –5 hours, respectively. After completion of the reaction of the solid product (II) with a transition metal compound, unreacted transition metal compound or the same together with solvent are separated by filtration, followed by repeated washings with a solvent such as normal hexane or the like to remove even a slight amount of free transition metal compound. The resulting solid is referred to as solid product (III).

This solid product (III) is combined with (F) an organoaluminum compound.

As the the organoaluminum compound, the examples are trialkylaluminums such as trimethylaluminum, triethylaluminum, triisobutylaluminum, tri-normal-hexylaluminum, tri-normal-octylaluminum, etc., dialkylaluminum monochlorides such as diethylaluminum monochloride, etc., alkylaluminum sesquichlorides such as ethylaluminum sesquichloride, alkylaluminum dichlorides such as ethylaluminum dichloride, etc. Further, alkoxyalkylaluminums such as monoethoxydiethylaluminum, diethoxymonoethylaluminum, etc. may be also employed.

The catalyst thus obtained is employed for producing ethylene polymers.

As for another olefin or a diolefin as a comonomer employed in a small amount for copolymerization of ethylene, the examples are straight chain monoolefins such as propylene, butene-1, hexene-1, octene-1, decene-1, etc., branched chain monoolefins such as 4-methyl-pentene-1, etc. and diolefins such as butadiene, etc.

The polymerization reaction is carried out usually in a hydrocarbon solvent such as normal hexane, heptane, octane, etc., and the polymerization temperature and pressure are in the ranges of room temperature (20° C) to 150° C and the atmospheric pressure to 50 Kg/cm², respectively. In the polymerization, a suitable amount of hydrogen may be added to the polymerization system to control the molecular weight of the resulting polymer.

A first effectiveness of the present invention lies in that ethylene polymers having a broad molecular weight distribution can be obtained. The molecular weight distribution of ethylene polymers obtained according to the method of the present invention is in the range of 10–30 as expressed by $\overline{M}w/\overline{M}n$. This range is remarkably broad as compared with the range of 4–8 as expressed by $\overline{M}w/\overline{M}n$ which is that of ethylene polymers obtained according to the methods of the prior inventions made by the present inventors, i.e. a polymerization method using a combination of solid product (I) with an organoaluminum. Thus if blow molding of hollow products is carried out using ethylene polymers obtained according to the method of the present invention, the resulting hollow products have a large parison swell (die swell), a large weight, a small parison draw-down, a small thickness distribution, a small number of projections and depressions and a beautiful appearance, without causing any melt-fracture at the time of molding. Whereas, if blow molding of hollow products is carried out using ethylene polymers obtained according to the abovementioned methods of the prior inventions made by the present inventors, molding is infeasible, or even if molding is feasible, it is necessary to carry out the molding at a lower extrusion speed; parison swell is small; the molded products have a small weight, a large parison draw-down, a large thickness distribution, a large number of projections and depressions on the surface and a worse appearance. Thus the products have notably inferior values as commercial products. When these two polymers are compared, it can be seen that the method of the present invention is much superior.

A second main effectiveness of the present invention lies in that, in combination with the above-mentioned first effectiveness, the transition metal is very effectively utilized and the catalyst activity is highly maintained. Namely, the yield of ethylene polymers per unit weight of transition metal is sufficiently high, amounting to $1 \times 10^4 - 5 \times 10^6$ g (polymer)/g (atoms of transition metal) under usual polymerization conditions. Further the yield of ethylene polymers per unit weight of solid product (III) is also sufficiently high, amounting to $1 \times 10^3 - 5 \times 10^4$ g (polymer)/g (solid product (III)). Accordingly, a small amount of catalyst used may be sufficient. Further, the catalyst residue contained in the ethylene polymers after polymerization is very small. Thus even if removal of catalyst still remaining in the ethylene polymers after completion of polymerization, i.e. a deashing process, is omitted, no coloring of polymer occurs, and also no bad influence such as deterioration of physical properties of polymers or rusting of mold at the time of molding of polymers can be observed. Another effectiveness of the present invention lies in that such superior effectivenesses as no formation of polymer film on the wall of reactor at the time of ethylene polymerization, and hence no problems resulting from formation of polymer film on the wall of reactor during the polymerization can be still maintained.

The method of the present invention will be further illustrated by way of the following non-limitative examples.

The definitions of symbols in Examples are as follows:

MI: melt index as measured according to ASTM D-1238 (measurement temperature, 190° C; load, 2.16 Kg; unit, g/10 minutes)

FR: flow ratio, a value obtained by dividing MI as measured under a load of 10.8 Kg by MI as measured under a load of 2.16 Kg

EXAMPLE 1

1. Preparation of solid product

Eighty grams of aluminum trichloride (anhydrous) was reacted with 58 g of magnesium hydroxide by mixing together the both, in advance, under pulverization by means of a vibration mill for 5 hours and thereafter heating the resulting mixture at 150° C for 10 hours. Dehydrochlorination occurred accompanying the reaction. After completion of the reaction, the resulting reaction mixture was cooled in a stream of nitrogen gas and then again pulverized by means of a vibration mill for 30 minutes to give a finely pulverized solid product.

100 Grams of the resulting solid product, 200 ml of xylene and 100 ml of titanium tetrachloride were introduced into a 500 ml round-bottom flask. Reaction was carried out at 130° C for 6 hours. The reaction took place while evolving hydrogen chloride. After completion of the reaction, unreacted titanium tetrachloride and xylene were separated by filtration in a dry box having been flushed with nitrogen gas. The resulting solid product was washed with 200 ml of normal hexane five times, and after no titanium was detected in the washing liquid, the solid was dried for 5 hours under a reduced pressure (−750 mmHg) to give a solid product (I) in which the content of titanium atoms was 5.6 mg (titanium atom)/g (solid product (I)).

Next, the reaction of solid product (I) with aluminum triisopropoxide $(Al(O-i-C_3H_7)_3)$ was carried out as follows:

80 Grams of the solid product (I) obtained according to the above-mentioned method and 20 g of aluminum triisopropoxide (reagent grade-special, on sale) were fed into a vibration mill having been flushed with nitrogen gas to pulverize them for 2 hours while maintaining the inside temperature at 45° C–55° C.

Thereafter reaction was carried out by heating the resulting mixture at 110° C for 5 hours. After completion of the reaction, the resulting reaction mixture was cooled and washed with 200 ml of normal hexane 4 times in a dry box having been flushed with nitrogen gas to remove unreacted aluminum triisopropoxide, followed by drying under a reduced pressure (−750 mmHg) for one hour to give 92 g of a solid product (II).

Next, the reaction of the solid product (II) with titanium tetrachloride was carried out as follows:

250 Ml of normal heptane and 4 ml of titanium tetrachloride were introduced into a 500 cc round-bottom flask, and thereafter 80 g of the solid product (II) was added. Reaction was carried out on heating at an inside temperature of 100° C for 3 hours. After completion of the reaction, separation by filtration was carried out in a dry box having been flushed with nitrogen gas. The resulting solid was washed with 200 ml of normal hexane 4 times, and after no titanium was detected in the washing liquid, the solid was dried under a reduced pressure (−750 mmHg) for 2 hours to give a solid product (III), in which the content of titanium atoms was 13.6 mg (titanium atom)/g (solid product (III)).

2. Polymerization of ethylene

260 L of normal hexane, 180 g of triisobutylaluminum $(Al(i-Bu)_3)$ and 19 g of the solid product (III) were introduced into a 500 l stainless steel reactor having been flushed with nitrogen gas. The reactor was closed and polymerization reaction was carried out under a hydrogen pressure (gauge) of 3 $Kg/cm^2$ and an ethylene pressure (gauge) of 6 $Kg/cm^2$ (the total pressure: 9.3 $Kg/cm^2$ (gauge)), at a polymerization temperature of 80° C, for one hour. After completion of the reaction, the resulting slurry containing an ethylene polymer was separated by filtration without deashing, followed by drying to give 43.5 Kg of white polymer. The yield of the polymer per gram of solid product (III) was 2,290 g (polymer/ g (solid product (III)). The catalyst efficiency was high, and although the deashing process was omitted, no coloring of polymer was observed. Further the yield of polymer per gram of titanium atoms contained in the solid product (III) was $1.7 \times 10^5$ g (polymer)/g (Ti atom). Thus the catalyst efficiency relative to titanium atom was extremely high, which shows the superior effectiveness of the method of the present invention. The melt index (MI) and flow ratio (FR) of this polymer were 0.26 and 26, respectively. No formation of polymer film was observed. This feature was similarly observed throughout the following Examples.

3. Measurement of molecular weight distribution

Using G.P.C. 200 type (trade name, manufactured by Waters Co.) (G.P.C.: Gel Permeation Chromatography), molecular weight distribution was measured with ethylene polymer dissolved in trichlorobenzene as solvent and having a concentration of 0.1–0.5%, at 140° C and a flow rate of 1 ml/min. As a result, the $\overline{Mw}/\overline{Mn}$ of the ethylene polymer obtained in this Example was 20.4. Thus the polymer had a sufficiently broad molecular weight distribution.

4. Blow molding of hollow product

Using a blow molding machine of IPB-10 type (trade name, manufactured by Ishikawajimaharima Co., Japan), granules prepared from the polymer obtained in this Example 1 was subjected to blow molding. The molding conditions were as follows: resin temperature, 180° C; injection pressure, 15 $Kg/cm^2$; injection time, 27 seconds; and number of rotation of screw, 50 rpm. (Blow moldings in the Examples and Comparative examples shown below were all similarly carried out under the same conditions and using the same mold as the above-mentioned.) The ethylene polymer obtained in this Example 1 had a small draw-down; caused no melt-fracture at the time of the molding; and no goose-skinned phenomenon was observed. The resulting molded product had no coloring and showed a good surface condition; and no projections and cavities were observed on the surface. The weight of the product was 750 g. It is a superior effectiveness of the present invention that such good blow-molding properties are exhibited.

COMPARATIVE EXAMPLE 1

Using solid product (I) obtained in Example 1 in place of solid product (III), ethylene polymerization was carried out in the same manner as in Example 1. The results are shown in Table 1.

Using the resulting polymer, blow molding was carried out in the same manner as in Example 1. As a result, melt-fracture at the time of the molding was remarkable and a goose-skinned phenomenon occurred. Also draw-down at the time of the molding was large, and the weight of the resulting molded product was 420 g, which was only 1/1.7 of the weight of the product of Example 1 (750 g). Further the product was much uneven in the thickness; had remarkable projections and cavities on the surface; and had a worse appearance. Thus the product was notably poor in the commercial value as a blow-molded product.

COMPARATIVE EXAMPLE 2

Using solid product (II) obtained in Example 1 in place of solid product (III), ethylene polymerization was carried out in the same manner as in Example 1. The results are shown in Table 1.

Using the resulting polymer, blow molding was carried out in the same manner as in Example 1. As a result, melt-fracture was notable; a goose-skinned phenomenon occurred; and the appearance of the resulting product was worse. Thus the product was notably poorer in the commercial value. Further the weight of the molded product was only 390 g, which was about half of the weight of the product of Example 1. Also the product was much uneven in the thickness.

COMPARATIVE EXAMPLE 3

In the reaction with the solid product (I) in Example 1, a method of reacting a reaction product obtained in advance by reacting an aluminum alcoholate with titanium tetrachloride, with solid product (I), was attempted. Namely, 250 ml of normal hexane, 20 g of aluminum triisopropoxide and 4 ml of titanium tetrachloride were introduced into a 500 ml round-bottom flask. Reaction was carried out at 100° C for 3 hours, followed by cooling. 80 Grams of solid product (I) obtained in Example 1 was added, and reaction was further carried out at 100° C for 3 hours. After the reaction, separation by filtration, washings and drying were carried out in the same manner as in Example 1, to give a solid product, in which the content of titanium atoms was 38.2 mg (titanium atom)/g (solid product). Using this solid product, ethylene polymerization was carried out in the same manner as in Example 1. The results are shown in Table 1. Using the resulting polymer, blow molding was carried out. As a result, similarly to Comparative examples 1 and 2, the weight of molded product was small (440 g); melt-fracture at the time of molding was notable; and only a molded product having a notably rough skin on the surface was obtained.

COMPARATIVE EXAMPLE 4

The reaction of solid product (I) obtained in Example 1, with an aluminum alcoholate and titanium tetrachloride was carried out in reverse order to that of Example 1. Namely, 250 ml of normal heptane and 4 ml of titanium tetrachloride were introduced into a 500 ml round-bottom flask. 80 Grams of solid product (I) was added. After reaction at 100° C for 3 hours, separation by filtration, washings and dryings were carried out in the same manner as in Example 1 to give a solid product. To 80 g of this solid product was added 20 g of aluminum triisopropoxide. Reaction was carried out for 2 hours in a vibration mill. Thereafter a further reaction was carried out at 110° C for 5 hours to give 90.5 g of a solid product (the content of titanium atoms: 5.4 mg (titanium atom)/g (solid product)).

Using this solid product, ethylene polymerization was carried out in the same manner as in Example 1. The results are shown in Table 1.

Using the resulting polymer, blow molding was carried out. Melt-fracture was notable; the surface state of molded product was worse; and the weight thereof was so small as 390 g.

COMPARATIVE EXAMPLE 5

Without reacting the reaction product of aluminum trichloride (anhydrous) with magnesium hydroxide, with titanium tetrachloride, said reaction product was reacted with an aluminum alcoholate and thereafter reacted with titanium tetrachloride and the result was compared with the effectiveness of Example 1.

Namely, without reacting a solid product obtained by reacting 80 g of aluminum trichloride (anhydrous) with 58 g of magnesium hydroxide, with titanium tetrachloride, said solid product was reacted with aluminum triisopropoxide in place of the solid product (I) of Example 1, in the same manner as in Example 1, and thereafter reacted with titanium tetrachloride, to give a solid product having a content of titanium atoms of 15.6 mg (titanium atom)/g (solid product).

Using this solid product, ethylene polymerization was carried out in the same manner as in Example 1. The results are shown in Table 1.

Using the resulting polymer, blow molding was carried out. Melt-fracture was notable; the molded product was lighter (359 g); and the projections and cavities of the surface were remarkable.

COMPARATIVE EXAMPLE 6

A reaction product of aluminum trichloride (anhydrous) with magnesium hydroxide was reacted with a reaction product of an aluminum alcoholate with titanium tetrachloride and the result was compared with the effectiveness of Example 1.

A reaction product of aluminum triisopropoxide with titanium tetrachloride obtained in the same manner as in Comparative example 3 was reacted with a reaction product of aluminum trichloride (anhydrous) with magnesium hydroxide obtained in Example 1, in place of solid product (I) of Comparative example 3, in the same manner as in Comparative example 3, to give a solid product having a titanium content of 32.5 mg (titanium atom)/g (solid product).

Using this solid product, ethylene polymerization was carried out in the same manner as in Example 1. The results are shown in Table 1.

The resulting polymer was subjected to blow molding. As a result, melt-fracture was notable; the weight of molded product was lighter (405 g); and the surface thereof had a number of projections and cavities. That is, the product was much inferior.

EXAMPLE 2

Solid product (III) was prepared by repeating Example 1 except that 75 g of magnesium oxide was substituted for 58 g of magnesium hydroxide in Example 1. The resulting solid product (III) had a content of titanium atoms of 12.5 mg (titanium atom) /g (solid product (III)).

Using this solid product (III), ethylene polymerization was carried out in the same manner as in Example 1. The results are shown in Table 1.

Using the resulting polymer, blow molding was carried out. No melt-fracture occurred; no goose-skinned phenomenon was observed; no coloring of molded product occurred; the surface state was good; no projections and cavities were observed on the surface; and the weight of the molded product was 725 g.

COMPARATIVE EXAMPLE 7

Catalyst preparation and ethylene polymerization were carried out in the same manner as in Example 2 except that magnesium oxide substituted for solid product (I) was reacted directly with an aluminum alkoxide. The resulting polymer was subjected to blow molding.

Namely, 75 g of magnesium oxide and 380 g of aluminum triisopropoxide were, in advance, mixed together under pulverization in a vibration mill for 2 hours, and thereafter reaction was carried out on heating at 100° C for 5 hours. The resulting powdery solid product was reacted with one liter of titanium tetrachloride in 1.5 l of normal heptane, under nitrogen atmosphere, with stirring, at 100° C for 3 hours. After completion of the reaction, normal heptane and unreacted titanium tetrachloride were distilled off under reduced pressure. The resulting solid was washed with one liter of normal hexane 4 times, and after no titanium was detected in the filtrate, the solid was dried under reduced pressure to give a solid product having a content of titanium atoms of 145 mg (titanium atom)/g (solid product).

Next, 7 l of normal hexane, 6.9 g of triisobutylaluminum and 0.805 g of said solid product were introduced into a 10 l reactor. Polymerization was carried out under a hydrogen pressure (gauge) of 5 Kg/cm$^2$ and an ethylene pressure (gauge) of 4 Kg/cm$^2$, at a polymerization temperature of 80° C, for one hour. After the reaction, 825 g of a white polymer was obtained without deashing. The results are shown in Table 1.

The resulting polymer was subjected to blow molding. The weight of the resulting mold product was 515 g and its surface condition was not preferable.

The results of this Comparative example was compared with those of Example 2. Namely, as for the yield of polymer and the availability of titanium atoms, per unit weight of solid product combined with an organoaluminum, this Comparative example was much inferior to Example 2; as for the FR and the molecular weight distribution of polymer, those of this Comparative example were slightly improved as compared with those of Comparative example 1, but were both much smaller than those of Example 2; as for the weight of the molded product, that of this Comparative example was improved as compared with that of Comparative example 1, but much inferior to those of Examples 1 and 2; and as for the blow moldability, this Comparative example was much inferior to Examples 1 and 2.

of molded products occurred; no projections and cavities were observed on the surface; the weights of molded products were 769 g (Example 3) and 743 g (Example 4); and the unevenness in the thickness, of molded products was small.

EXAMPLE 5

Solid product (III) was prepared in the same manner as in Example 1 except that 72 g of hydromagnesite (3MgCO$_3$. Mg(OH)$_2$.3H$_2$O) was substituted for 58 g of magnesium hydroxide.

The resulting solid product (III) was subjected to ethylene polymerization as follows:

3.5 L of normal hexane, 450 mg of triisobutylaluminum (Al(iso-Bu)$_3$) and 255 mg of solid product (III) were introduced into a 5 l capacity stainless steel reactor flushed with nitrogen gas. The reactor was closed, and polymerization reaction was carried out under a hydrogen pressure (gauge) of 3 Kg/cm$^2$ and an ethylene pressure (gauge) of 6 Kg/cm$^2$, at a polymerization temperature of 80° C, for one hour. After completion of the reaction, the resulting slurry containing an ethylene polymer was separated by filtration and dried, without deashing, to give 525 g of a white polymer. The results are shown in Table 2.

EXAMPLES 6–10

Preparation of solid product (III) was carried out in

Table 1

| | Specific feature of catalyst | | Polymer yield (g) per g (Ti) | Polymer Yield (g) per g (solid product)* | Physical properties of polymer | | |
|---|---|---|---|---|---|---|---|
| | (B) | Solid product to be combined with (F) | | | Mw/Mn | MI | FR |
| Example 1 | Mg(OH)$_2$ | Product of present invention | 1.7 × 10$^5$ | 2,290 | 20.4 | 0.26 | 26 |
| Comparative Ex. 1 | " | (I)** as it is | 3.3 × 10$^5$ | 1,840 | 7.5 | 0.28 | 14 |
| " 2 | " | (II)** as it is | 3.4 × 10$^5$ | 1,670 | 5.6 | 0.21 | 13.6 |
| " 3 | " | Product obtained in advance by reacting (E) with (D) was reacted with (I) | 3.8 × 10$^4$ | 1,470 | 7.9 | 0.32 | 14.5 |
| " 4 | " | After (II) was formed, the order of reaction of (E) and that of (D) were reversed. | 3.0 × 10$^5$ | 1,480 | 5.0 | 0.29 | 13.0 |
| " 5 | " | Reaction product of (A) with (B) was reacted with (E) and then with (D), not via (I). | 8.2 × 10$^4$ | 1,280 | 4.8 | 0.38 | 12.8 |
| " 6 | " | Reaction product of (A) with (B) was reacted with reaction product of (E) with (D), not via (I). | 3.6 × 10$^4$ | 1,170 | 5.1 | 0.24 | 13.3 |
| Example 2 | MgO | Product of present invention | 1.6 × 10$^5$ | 2,030 | 19.8 | 0.38 | 25.6 |
| Comparative Ex. 7 | " | Direct reaction product of (B) with (E) was reacted with (D). | 7.1 × 10$^3$ | 1,025 | 10.6 | 0.29 | 17.5 |

*Product to be used combined with organoaluminum. In cases of Examples 1 and 2, solid product (III).
**Solid product (I) or (II).

EXAMPLES 3 and 4

Catalyst preparation and ethylene polymerization were carried out in the same manner as in Example 1 except that 80 g of magnesium carbonate (Example 3) or 65 g of magnesium chloride.6H$_2$O (Example 4) was substituted for 58 g of magnesium hydroxide of Example 1. The results are shown in Table 2.

The resulting polymers were subjected to blow molding. Both the polymers caused no melt-fracture; no goose-skinned phenomenon was observed; no coloring the same manner as in Example 1 except that, in place of 58 g of magnesium hydroxide of Example 1, other divalent metal compounds (each by gram) were used as (B), and in Example 9 alone, 75 g of FeCl$_3$ (anhydrous) was substituted for 80 g of AlCl$_3$, and preparation of ethylene polymers were carried out in the same manner as in Example 5. Thereafter the molecular weight distributions and other physical properties of the resulting polymers were measured. The results are shown in Table 2.

Table 2

| Example No. | Catalyst | | | Ti (mg) per (III)** g | Polymer yield (g) | | Physical properties of polymer | | |
|---|---|---|---|---|---|---|---|---|---|
| | Specific feature | | | | per Ti g | per (III) g | Mw/Mn | MI | FR |
| | (A) | (B) * | (used amount) | | | | | | |
| 3 | AlCl$_3$ | MgCO$_3$ | | 17.2 | 1.1 × 10$^5$ | | 23.5 | 0.19 | 28.6 |

Table 2-continued

| Example No. | Catalyst Specific feature (A) | Catalyst Specific feature (B) * (used amount) | Ti (mg) per (III)** g | Polymer yield (g) per Ti g | Polymer yield (g) per ** (III) g | Physical properties of polymer $\overline{M}w/\overline{M}n$ | MI | FR |
|---|---|---|---|---|---|---|---|---|
| 4 | " | MgCl$_2$ (6H$_2$O) (80 g) | 22.1 | $0.87 \times 10^5$ | 1,830 | 21.4 | 0.28 | 25.6 |
| 5 | " | Hydromagnesite (3MgCO$_3$ . Mg(OH)$_2$ . 3H$_2$O) (65 g) | 29.3 | $0.70 \times 10^5$ | 1,930 | 17.5 | 0.28 | 28.5 |
| 6 | " | MnCl$_2$ (4H$_2$O) (72 g) | 29.8 | $0.8 \times 10^5$ | 2,059 | 16.8 | 0.34 | 23.8 |
| 7 | " | Hydrotalcite (Mg$_6$Al$_2$(OH)$_{16}$CO$_3$ . 4H$_2$O) (80 g) | 15.6 | $1.8 \times 10^5$ | 2,380 | 19.8 | 0.18 | 27.8 |
| 8 | " | Aluminum-magnesium oxide (MgAl$_2$O$_4$) (45 g) | 18.5 | $1.7 \times 10^5$ | 2,860 | 18.8 | 0.26 | 29.8 |
| 9 | FeCl$_3$ | Silicon-magnesium oxide (Mg$_2$SiO$_4$) (35 g) | 16.9 | $1.5 \times 10^5$ | 3,180 | 17.9 | 0.54 | 26.7 |
| 10 | AlCl$_3$ | Magnesium-calcium oxide (dolomite) (MgCa(CO$_3$)$_2$) (45 g) | 18.6 | $1.6 \times 10^5$ | 2,470 | 18.6 | 0.15 | 32.4 |
|  |  |  |  |  | 3,040 |  |  |  |

*Used amount under the same conditions as those of catalyst preparation of Example 1 (this note applies to the following Tables).
**Solid product (III) (This note applies to the following Tables).

EXAMPLES 11 - 14

Solid product (III) was prepared in the same manner as in Example 1 except that other kinds of alcoholates of aluminum or boron were substituted for 20 g of aluminum triisopropoxide, and preparation of ethylene polymers was carried out in the same manner as in Example 5. Thereafter the molecular weight distributions and other physical properties of the resulting polymers were measured. The results are shown in Table 3.

Table 3

| Example No. | Catalyst Specific feature (E) alcoholate (g) (used amount) | Ti (mg) per (III) g | Polymer yield (g) per Ti g | Polymer yield (g) per (III) g | Physical properties of polymer $\overline{M}w/\overline{M}n$ | MI | FR |
|---|---|---|---|---|---|---|---|
| 11 | Aluminum triethoxide Al(OC$_2$H$_5$)$_3$ (35 g) | 21.2 | $1.3 \times 10^5$ | 2,860 | 17.9 | 0.24 | 29.4 |
| 12 | Mono-sec-butoxyaluminum diisopropoxide (i-C$_3$H$_7$O)$_2$Al(sec-C$_4$H$_9$O) (24 g) | 18.4 | $1.3 \times 10^5$ | 2,430 | 16.9 | 0.38 | 25.5 |
| 13 | Aluminum tri-sec-butoxide Al(sec-C$_4$H$_9$O)$_3$ (28 g) | 21.4 | $1.4 \times 10^5$ | 2,940 | 15.9 | 0.59 | 24.8 |
| 14 | Boron triisopropoxide B(i-C$_3$H$_7$O)$_3$ (18 g) | 24.5 | $0.6 \times 10^5$ | 1,430 | 18.6 | 0.15 | 30.5 |

EXAMPLES 15 - 17

Solid product (III) was prepared in the same manner as in Example 1 except that solid product (II) was reacted with other transition metal compounds (each by ml) in place of 4 ml of titanium tetrachloride of Example 1, and preparation of ethylene polymers was carried out in the same manner as in Example 5, followed by measurements of molecular weight distributions and other physical properties of the resulting polymers. The results are shown in Table 4.

Table 4

| Ex. No. | Specific feature of catalyst Transition metal compound reacted with (II) (used amount) | content of transition metal (mg) (in the left column) per (III) g | Polymer yield per total transition metal (g) | Polymer yield per (III) g | Physical properties of polymer $\overline{M}w/\overline{M}n$ | MI | FR |
|---|---|---|---|---|---|---|---|
| 15 | VCl$_4$ (7 ml) | 5.6 | $1.8 \times 10^5$ | 2,070 | 17.4 | 0.34 | 26.9 |
| 16 | VOCl$_3$ (5 ml) | 7.4 | $1.4 \times 10^5$ | 1,870 | 18.3 | 0.28 | 25.4 |
| 17 | Monochlorotributoxytitanium Ti(OBu)$_3$Cl (5 g) | 18.4 | $1.4 \times 10^5$ | 2,490 | 14.6 | 0.54 | 23.5 |

EXAMPLE 18

The reaction of solid product (I) with aluminum triisopropoxide, of Example 1 was carried out in a solvent in place of a vibration mill.

Namely, 80 g of solid product (I) obtained in Example 1, 30 g of aluminum triisopropoxide and 200 ml of normal heptane were introduced into a 500 ml flask provided with a reflux condenser. Reaction was carried out at 100° C for 3 hours. After completion of the reaction, the resulting mixture was cooled, followed by removing the supernatant liquid, adding 200 ml of normal heptane, decanting to remove the supernatant liquid and adding 250 ml of normal heptane and 15 ml of titanium tetrachloride. Thereafter reaction was carried out on heating at an inside temperature of 100° C, for 3 hours. Thereafter solid product (III) was obtained in the same manner as in Example 1. The content of titanium in the solid product was 18.4 mg (titanium atom)/g (solid product (III)). Ethylene polymerization was carried out in the same manner as in Example 5. The yield of the resulting ethylene polymer was 3,080 g (polymer)/g (solid product (III)) and $1.7 \times 10^5$ g (polymer)/g (titanium atom). MI = 0.19; FR = 30.5; $\overline{M}w/\overline{M}n$ = 20.4.

EXAMPLE 19

Preparation of ethylene polymer was carried out in the same manner as in Example 5 except that 240 mg of solid product (III) of Example 1 and 730 mg of tri-normal-hexylaluminum as organoaluminum compound were used. The molecular weight distribution of the resulting polymer was then measured. The yield of ethylene polymer was 1,850 g (polymer)/g (solid product) and $1.4 \times 10^5$ g (polymer)/g (titanium atom). MI = 0.64; FR = 35.0; $\overline{M}w/\overline{M}n$ = 22.3.

EXAMPLE 20

Preparation of ethylene polymer was carried out in the same manner as in Example 5 except that as solid product (III), 210 mg of that of Example 1 and as an organoaluminum compound, 580 mg of tri-normal-octylaluminum were used, and the molecular weight distribution of the resulting polymer was measured in the same manner as in Example 5. The yield of ethylene polymer was 1,780 g (polymer)/g (solid product (III)) and $1.3 \times 10^5$ g (polymer)/g (titanium atom). MI × 0.82; FR × 36.5; and $\overline{M}w/\overline{M}n$ × 22.8.

EXAMPLE 21

Copolymerization of ethylene with butene-1 was carried out in place of homo-polymerization of ethylene of Example 5. In place of the polymerization under an ethylene pressure (gauge) of 6 Kg/cm², of Example 5, an ethylene gas containing 8% by volume of butene-1 was subjected to polymerization under a gauge pressure of 6 Kg/cm². Ethylene-butene-1 copolymer was prepared in the same manner as in Example 5. The yield of ethylene-butene copolymer was 2,360 g (polymer)/g (solid product (III)) and $0.8 \times 10^5$ g (polymer)/g (titanium atom). MI = 0.72; FR = 25.6; $\overline{M}w/\overline{M}n$ = 18.2

EXAMPLE 22

Ethylene-propylene copolymer was prepared in the same manner as in Example 5. In place of the polymerization under a hydrogen pressure (gauge) of 3 Kg/cm² and an ethylene pressure (gauge) of 6 Kg/cm², of Example 5, an ethylene gas containing 10% by volume of propylene was subjected to polymerization under a hydrogen pressure (gauge) of 1.5 Kg/cm². Thus, ethylene-propylene copolymer was prepared. The yield of the copolymer was 2,960 g (polymer)/g (solid product (III)) and $1.0 \times 10^5$ g (polymer)/g (titanium atom). MI = 0.28; FR = 29.6; $\overline{M}w/\overline{M}n$ = 19.4

What is claimed is:

1. In the method for producing ethylene polymers by homo-polymerization of ethylene or copolymerization of ethylene with a small amount of another α-olefin or a diolefin in the presence of a catalyst obtained by combining a solid product having on its surface, atoms of a transition metal of Group IVA or VA of the Periodic Table, with an organoaluminum compound, an improvement which comprises using as said solid product, (III) a solid product obtained by reacting (A) $AlCl_3$ or $FeCl_3$ with (B) a divalent metal hydroxide, oxide or carbonate or a double salt containing these compounds or a hydrate of divalent metal compound; reacting the resulting reaction product with (D) a compound of a transition metal of Group IVA or VA of the Periodic Table in the form of liquid; reacting (I) the resulting solid product with an aluminum trialkoxide or boron trialkoxide; and reacting (II) the resulting solid product again with (D') a compound of a transition metal of Group IVA or VA of the Periodic Table, same as or different from said (D), in the form of liquid.

2. A method according to claim 1 wherein said alcoholate of aluminum or boron is selected from the group consisting of $Al(OEt)_3$, $Al(O\ i\text{-}C_3H_7)_3$, $Al(O\ sec\text{-}C_4H_9)_3$, $(i\text{-}C_3H_7O)_2Al(sec\text{-}C_4H_9O)$ and $B(O\ i\text{-}C_3H_7)_3$.

3. A method according to claim 1 wherein the reaction of said solid product (I) with said aluminum trialkoxide or boron trialkoxide is carried out in a proportion of 0.1–1,000g of said alcoholate of aluminum or boron per 100 g of said solid product (I), at a reaction temperature of room temperature to 500° C and for a reaction time of 10 minutes to 50 hours.

4. A method according to claim 1 wherein the reaction of said solid roduct (I) with said aluminum trialkoxide or boron trialkoxide is carried out in a proportion of 0.1–1,000 g of said alcoholate of aluminum or boron per 100 g of said solid product (I), at a reaction temperature of room temperature to 500° C, for a reaction time of 10 minutes to 50 hours and in the presence of a solvent selected from the group consisting of aliphatic hydrocarbons, aromatic hydrocarbons and halogenated hydrocarbons, in an amount of 1–1,000 ml per 100 g of the total amount of said solid product (I) and said alcoholate of aluminum or boron.

5. A method according to claim 1 wherein said transition metal compound to be reacted with said solid product (II) is selected from the group consisting of halides, oxyhalides, alkoxides, alkoxyhalides and acetoxyhalides of titanium or vanadium.

6. A method according to claim 1 wherein said transition metal compound to be reacted with said solid product (II) is selected from the group consisting of $TiCl_4$, $Ti(OBu)_3Cl$, $VCl_4$, $VOCl_3$, $TiBr_4$, $Ti(OC_2H_5)_4$, $Ti(OBu)_4$, $Ti(OBu)_2Cl_2$ and $Ti(OBu)Cl_3$.

7. A method according to claim 1 wherein the reaction of said solid product (II) with said transition metal compound is carried out in a proportion of 1–500 g of said transition metal compound per 100 g of solid product (II), at a reaction temperature of 30–200° C and for a reaction time of 10 minutes – 5 hours.

8. A method according to claim 1 wherein the reaction of said solid product (II) with said transition metal compound is carried out in a proportion of 1–500 g of said transition metal compound per 100 g of said solid product (II), at a reaction temperature of 30°–200° C, for a reaction time of 10 minutes – 5 hours and in the presence of a solvent selected from aliphatic hydrocarbons, aromatic hydrocarbons and halogenated hydrocarbons in an amount of 1–1,000 ml per 100 g of the total amount of said solid product (II) and said transition metal compound.

9. A method according to claim 1 wherein said transition metal compound to be reacted with said solid product (II) is Ti(OBu)$_2$Cl$_2$ or Ti(OBu)Cl$_3$ and used in the form of a solution having it dissolved in a solvent.

10. A method according to claim 1 wherein said divalent metal compound is selected from the group consisting of Mg(OH)$_2$, MgO, MgCO$_3$, MgCl$_2$.6H$_2$O, hydromagnesite (3MgCO$_3$.Mg(OH)$_2$.3H$_2$O), MnCl$_2$.4H$_2$O, hydrotalcite (Mg$_6$Al$_2$(OH)$_{16}$CO$_3$.4H$_2$O), aluminum magnesium oxide (MgAl$_2$O$_4$), silicon magnesium oxide (Mg$_2$SiO$_4$) and magnesium calcium carbonate (dolomite, MgCa(CO$_3$)$_2$).

11. A method according to claim 1 wherein said divalent metal compound is selected from the group consisting of Ca(OH)$_2$, Ba(OH)$_2$, Zn(OH)$_2$, Mn(OH)$_2$, Fe(OH)$_2$, Co(OH)$_2$, Ni(OH)$_2$, CaO, BaO, ZnO, MnO, FeO, CoO, NiO, Mg$_6$MnO$_8$, MnCO$_3$, CaCO$_3$, BaCO$_3$, SnCl$_2$.2H$_2$O, NiCl$_2$.6H$_2$O, KMgCl$_3$.6H$_2$O, BaCl$_2$.2H$_2$O, 8MgO.MgCl$_2$.15H$_2$O and 3MgO.2SiO$_2$.2H$_2$O.

12. A method according to claim 1 wherein the reaction of said solid product of a trivalent metal halide with a divalent metal compound, with said transition metal compound is carried out in the presence of a solvent selected from the group consisting of aromatic hydrocarbons, alkyl-substituted aromatic hydrocarbons, polynuclear aromatic hydrocarbons, halogenated aromatic hydrocarbons, aromatic alkoxides and aromatic ethers.

13. A method according to claim 1 wherein said transition metal compound to be reacted with said solid reaction product of a trivalent metal halide with a divalent metal compound is selected from the group consisting of halides, oxyhalides, alkoxides, alkoxyhalides and acetoxyhalides of titanium or vanadium.

14. A method according to claim 1 wherein said transition metal compound to be reacted with said solid reaction product of a trivalent metal halide with a divalent metal compound is selected from the group consisting of TiCl$_4$, Ti(OBu)$_3$Cl, VCl$_4$, VOCl$_3$, TiBr$_4$, Ti(OC$_2$H$_5$)$_4$, Ti(OBu)$_4$, Ti(OBu)$_2$Cl$_2$ and Ti(OBu)Cl$_3$.

15. A method according to claim 1 wherein said organoaluminum compound to be combined with said solid product (III) is selected from the group consisting of trialkylaluminums, dialkylaluminum monochlorides, alkylaluminum sesquichlorides, alkylaluminum dichlorides and alkoxyalkylaluminums.

16. A method according to claim 1 wherein said homopolymerization of ethylene or copolymerization of ethylene with a small amount of another α-olefin or a diolefin is carried out in a hydrocarbon solvent, in the presence of hydrogen, at a polymerization temperature of room temperature (20° C) to 150° C and under a polymerization pressure from the atmospheric pressure to 50 Kg/cm$^2$.

17. A method according to claim 1 wherein said another α-olefin or diolefin is selected from the group consisting of propylene, butene-1, hexene-1, octene-1, decene-1, 4-methyl-pentene-1 and butadiene.

18. A method according to claim 1 wherein
 i. (A) (a trivalent metal halide) is AlCl$_3$ or FeCl$_3$, and the reaction of (A) with (B) (a divalent metal hydroxide, oxide or carbonate or a double salt containing these compounds or a hydrate of divalent metal compound) is carried out in a proportion of the number of atoms of (B) per atom of (A), of 1–10, at a reaction temperature of 80° C–300° C and at a reaction time of 30 minutes – 50 hours;
 ii. (D) (a compound of a transition metal of Group IVA or VA of the Periodic Table in the form of liquid) is selected from the group consisting of halides, oxyhalides, alkoxides, alkoxyhalides and acetoxyhalides of titanium or vanadium, and the reaction of the solid reaction product of (A) with (B), with (D) is carried out in a proportion of 0.01–100 g of (D) per one gram of the solid reaction product of (A) with (B), in the presence of a solvent selected from the group consisting of aromatic hydrocarbons, alkyl-substituted aromatic hydrocarbons, polynuclear aromatic hydrocarbons, halogenated hydrocarbons, aromatic alkoxides and aromatic ethers, in an amount of 0.05–100 ml per one gram of the solid reaction product of (A) with (B), at a reaction temperature of 50° C–300° C and for a reaction time of 30 minutes–10 hours, followed by separation by filtration and washing with a solvent to remove unreacted transition metal compound;
 iii. the reaction of said solid product (I) with said alcoholate of aluminum or boron is carried out in a proportion of 1–200 g of said aluminum trialkoxide or boron trialkoxide per 100 g of (I), at a reaction temperature of 40° C–200° C and for a reaction time of 10 minutes – 50 hours, followed by washing with a solvent capable of dissolving said alcoholate of aluminum or boron to remove unreacted alcoholate of aluminum or boron;
 iv. (D') said compound of a transition metal of Group IVA or VA of the Periodic Table same or different from (D) is selected from the group consisting of halides, oxyhalides, alkoxides, alkoxyhalides and acetoxyhalides of titanium or vanadium, and the reaction of said solid product (II) with this compound of a transition metal is carried out in a proportion of 1–500 g of this compound of a transition metal per 100 g of (II), in the presence of a solvent selected from the group of aliphatic hydrocarbons, aromatic hydrocarbons and halogenated hydrocarbons, in an amount of 1–1,000 ml per 100 g of the total amount of (II) and this compound of transition metal, at a reaction temperature of 30°C–200° C and for a reaction time of 10 minutes–5 hours, followed by separation by filtration and washing with a solvent to remove unreacted compound of transition metal; and
 v. said homo-polymerization or copolymerization is carried out in a hydrocarbon solvent, at a polymerization temperature from room temperature (20° C) to 150° C, under a polymerization pressure from the atmospheric pressure to 50 Kg/cm$^2$ and in the presence of hydrogen.

* * * * *